July 19, 1960 G. D. ALVORD 2,945,938
HEATED LINER FOR TROUGH FEEDERS
Filed June 10, 1958 3 Sheets-Sheet 1

INVENTOR.
GROVE D. ALVORD
BY
William D Carothers
HIS ATTORNEY

July 19, 1960  G. D. ALVORD  2,945,938
HEATED LINER FOR TROUGH FEEDERS
Filed June 10, 1958  3 Sheets-Sheet 2

INVENTOR.
GROVE D. ALVORD
BY William D. Carothers
HIS ATTORNEY

July 19, 1960 G. D. ALVORD 2,945,938
HEATED LINER FOR TROUGH FEEDERS
Filed June 10, 1958 3 Sheets-Sheet 3
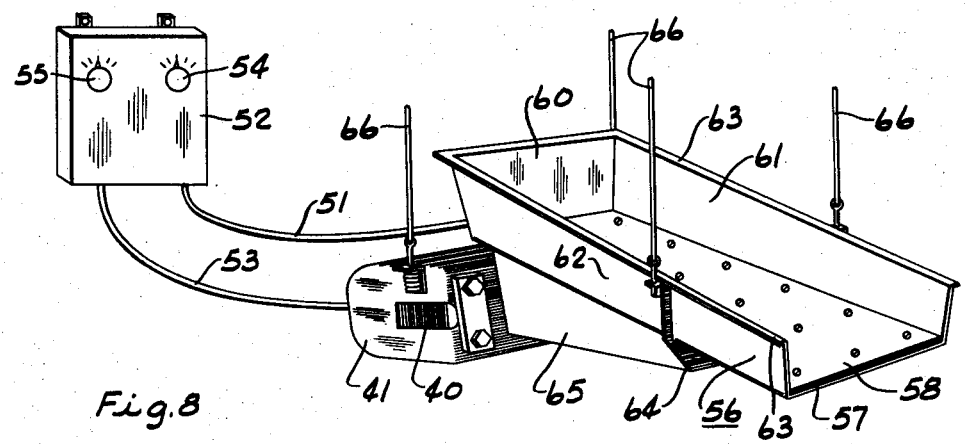
Fig. 8
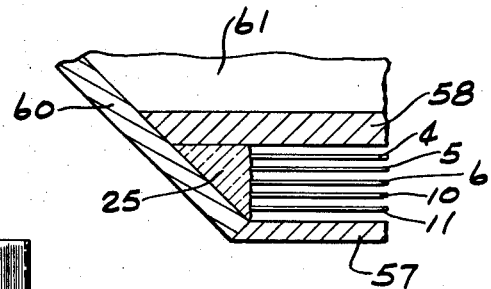
Fig. 9
Fig. 10
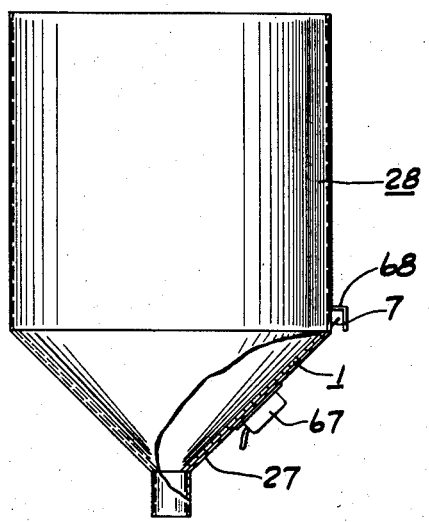
INVENTOR.
GROVE D. ALVORD
BY William D. Carothers
HIS ATTORNEY

United States Patent Office 2,945,938
Patented July 19, 1960

2,945,938
HEATED LINER FOR TROUGH FEEDERS

Grove D. Alvord, Indiana, Pa., assignor to Syntron Company, Homer City, Pa., a corporation of Delaware Filed June 10, 1958, Ser. No. 741,103

11 Claims. (Cl. 219—19)

This invention relates generally to the art of vibratory conveying and more particularly to apparatus for the method of making and of conveying damp, tacky bulk material by vibratory equipment.

Damp and tacky bulk material cannot be fed successfully by vibratory equipment such as a vibrated bin, hopper or a vibratory feeder. The mass sticks together and is very difficult to move. This problem has been overcome by this invention by the application of heat to the under portion of the bulk material sufficiently to flash bake particles that assume the characteristic of granules affected by the feeding vibrations to roll the damp, tacky bulk material along the conveyor path. It is not attempted to heat the whole of the bulk material to drive off the moisture and form granules, but merely the under portion that supports the bulk material.

A further object is the method of manufacturing this heater or liner. It has been discovered that if proper steps are not adhered to the liner will burn out before it should fail. The principal object to overcome this problem is to carefully assemble the so called sandwich heater and then thoroughly bake and dry it out. This may be done in an oven but the most practical way is to use the heater itself to bake and dry out the assembled insulating parts before sealing. Then it is important to seal the face of the wearing plates around all of the mounting bolts which are chosen to provide uniform clamping over the entire wearing plate. The bolts are sealed by welding or brazing or soldering depending upon the character of the wearing plate or liner. It may be stainless steel, hot or cold-rolled steel, aluminum or other suitable metals and alloys.

After the assembled liner has been baked, it is then sealed around its edges or other openings by a cement that will remain flexible and can stand reasonably high temperatures for electric surface heaters, and will keep out any moisture but permits the plates forming the assembly to breathe or expand and contract or move under their clamped relation. This materially aids in extending the life of the heated liner.

Another object of this invention is the structure of the liner and the disposition of the wire and mounting bolts relative to the orientation of the liner together with location and construction of the terminals.

Other objects and advantages appear in the following description and claims.

The accompanying drawings show for the purpose of exemplification without limiting the invention or claims thereto certain practical embodiments of the invention wherein:

Fig. 8 is a perspective view of a flat bottom feeder trough having a heated liner and with motor and controller.

Fig. 9 is an enlarged detailed sectional view of one corner of the feeder trough of Fig. 8.

Fig. 10 is a view in side elevation of a hopper partly in section showing a heated liner therein.

Figure 1:
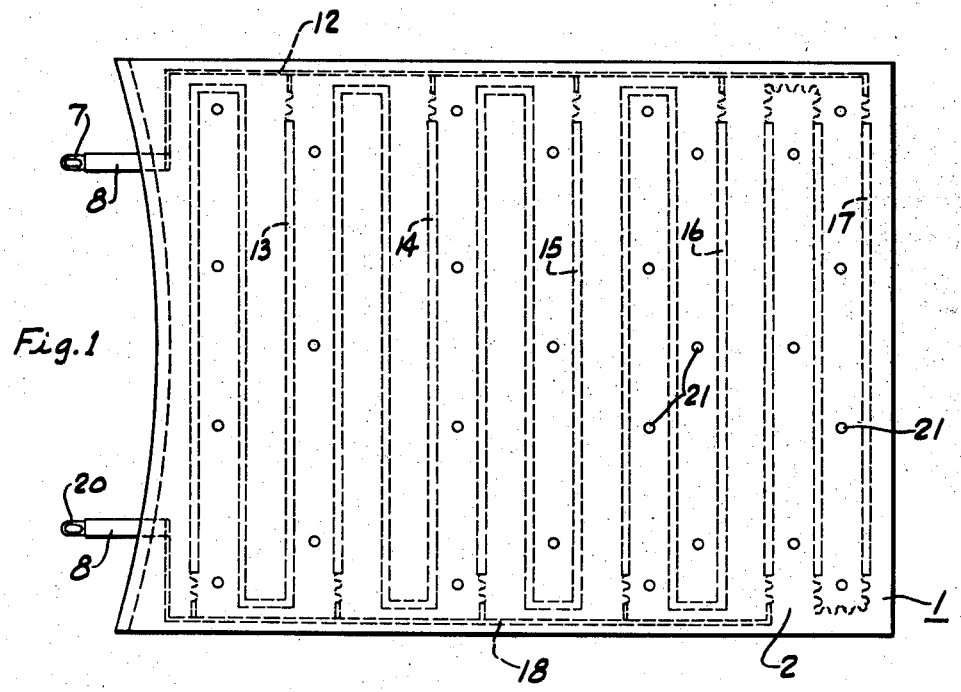
Fig. 1 is a plan view of a heater wave resistant liner for a feeder trough.
Figure 2:
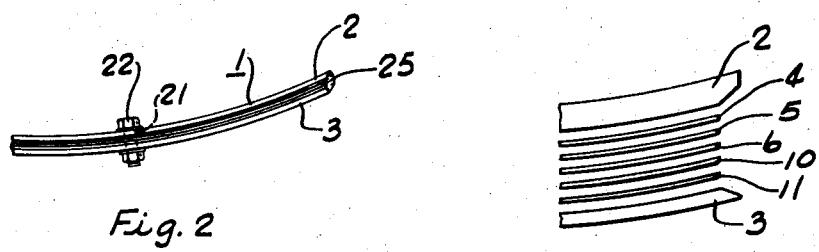
Fig. 2 is an enlarged end view showing a portion of the feeder trough liner shown in Fig. 1.
Figure 3:
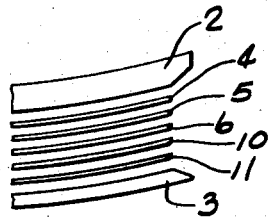
Fig. 3 is an enlarged exploded end view of one corner of the feeder trough liner shown in Fig. 2.

Referring to Figs. 1 to 3 of the drawings the heated liner comprising this invention is shown in Fig. 1 as being an independent heater unit 1 having a face wearing plate 2 and a back plate 3 with the intermediate parts sandwiched therebetween. The whole of the back surface of the face wearing plate 2 is covered by the mica sheet 4. The mica sheet 4 is then covered with the asbestos sheet 5. The heat required for the particular vibratory conveyor is then determined from figures of the moisture content and character of the bulk material to be conveyed. The amount of sinuated wire needed in the series and parallel circuits to provide the heat required over the area of the liner wearing plate 2 is then determined and is laid out in a manner similar to that shown. The sinuated wire winding 6 may start at the strip terminal 7 covered by a multiple layer Fiberglas insulation sleeve 8 passing into the assembly to between the asbestos sheets 5 and 10 and the second mica sheet 11 covering the back plate 3. The inner end of the strip terminal 7 is joined with a nickel ribbon bus member 12 which could be replaced by a sinuated wire heavier than the parallel circuits. The parallel circuits are indicated at 13, 14, 15, 16 and 17, and each has three passes of flat sinuated resistance wire and terminals in the nickel ribbon bus line 18 on the opposite side of the liner which in turn is connected to the strip terminal 20 which is also covered with a multiple layer Fiberglas insulating sleeve 8.

Although the liner 1 is made for a feeder trough having an arcuate bottom it may be flat as illustrated in Figs. 8 and 9.

After the size and layout of the sinuated heating wire has been determined, the clamping bolt holes 21 are then marked and drilled and countersunk. As shown in Fig. 1, the parallel circuit 17 is clamped by four bolts between their outer or first and second passes and three bolts between the second and third passes. This positions the bolts so that they clamp alternate adjacent areas but the single parallel circuit 17 is thus independently clamped and the greater number of bolts are adjacent the discharge end or lip of the wearing plate.

The bolts 22 for the next inwardly positioned parallel circuit has three bolts between the first and second pass and four bolts between the second and third pass.

The remainder of the parallel circuits are bolted with only six bolts, three between the first and second and between the second and third passes. This arrangement keeps the discharge end of the conveyor liner tight if there is a tendency for the conveyor to whip at the end due to misaligned center of gravity of the motor trough parts.

When the liner is made up, a few machine bolts 22 as shown in Fig. 2 are secured in the holes 21 to firmly hold the assembly in place while the heater is overheated to dry out the assembly.

Figure 7:
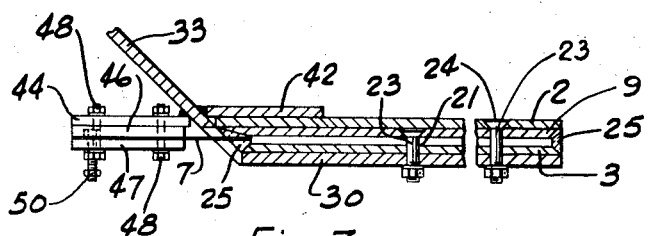
Fig. 7 is an enlarged detailed sectional view of the liner mounted in the feeder trough illustrating the terminals.

When the assembly is fully dried, the bolts 22 are replaced by flat headed bolts 23 as shown in Fig. 7 and their heads are welded over as shown at 24.

A silicon rubber paste is then used to seal around the edges of the assembly as indicated at 25. This paste has a good adhering quality to the metal and remains pliable to permit it to breathe under varying degrees of temperature and pressure and the vibration during these conditions.

Figure 4:
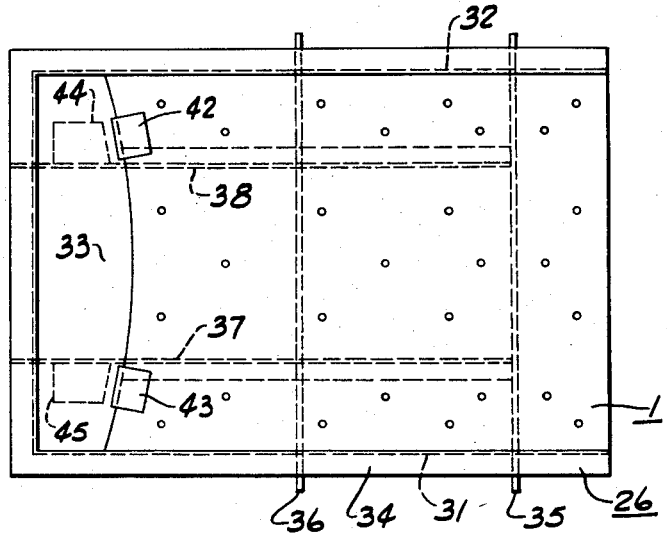
Fig. 4 is a plan view of the feeder trough with the liner applied.
Figure 5:
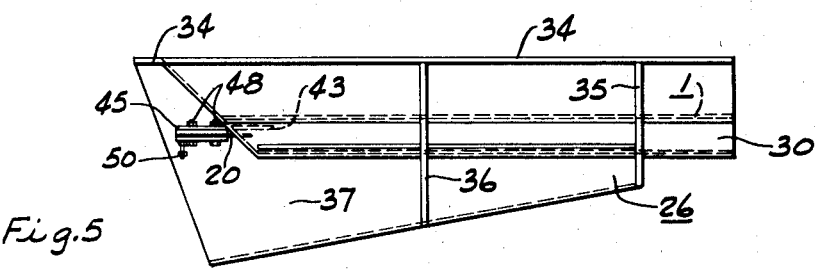
Fig. 5 is a view in side elevation of the feeder trough shown in Fig. 4.
Figure 6:
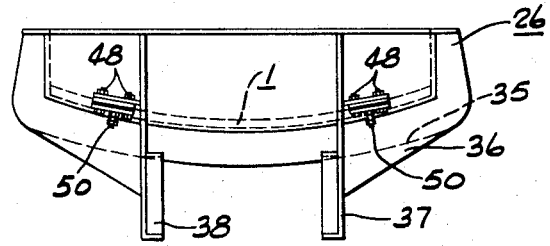
Fig. 6 is a view in end elevation of the feeder trough with the liner in place.

The heated liner 1 with the bolts 23 are then mounted in the feeder trough 26 shown in Figs. 4, 5 and 6 or the bottom section 27 of the hopper 28 shown in Fig. 10 and the bolts 23 extend through the trough or hopper and are bolted thereto so that the assembly has the action of a unitary plate and will vibrate only as a stiff and single member.

The feeder trough 26 of Figs. 4 to 6 has an arcuate bottom 30 that is joined by the side walls 31 and 32 and the sloping back wall 33, all of which are connected together by the stiffener flange plate 34 that extends around the perimeter of these walls. A pair of transverse reinforcing ribs 35 and 36 are welded to the bottom and side walls. A spaced pair of longitudinally disposed motor plates 37 and 38 are welded to the bottom 30 and back 33 and to the flange 34 and the ribs 35 and 36. The back of these plates support the armature and embrace the springs 40 which connect this trough or member to be vibrated to the base casting 41 that carries the electromagnetic field of this motor as shown in Fig. 8.

The trough 26 is provided with two shields 42 and 43 welded to the back 33 over the openings through which the terminals 7 and 20 extend. These shields are welded to the back and protect the terminals as they pass from the liner through the back. Brackets 44 and 45 are welded to the outer face of the back and having the insulating blocks 46 and 47 fastened thereto by the bolts 48 as shown in Figs. 5, 6 and 7. A contact bolt 50 is carried by each pair of insulating blocks to connect the terminals to the supply circuit through the cable 51 to the control box 52 as shown in Fig. 8. The other cable 53 supplies the electromagnetic field in the base casting 41. Suitable controls 54 and 55 in the box 52 are provided for the heated liner and the vibratory motor respectively.

In the structure shown in Figs. 8 and 9, the trough 56 has a flat bottom 57 and the liner assembly illustrated by the wearing plate 58 is assembled on the trough bottom 57 as the back plate of the heated liner. The silicon rubber paste 25 fills in around the perimeter of this liner. The back wall 60 and the side walls 61 and 62 are joined on the bottom 57 and to each other with the stiffening rim 63. A transverse brace 64 and spaced motor plates 65 are also provided for the purpose of suspending the armature and trough on the springs 40. Four suspension lines 66 support the feeder trough and motor.

The hopper 28 of Fig. 10 is vibrated by the electromagnetic vibratory motor 67 and the terminals 7 and 20 extend through the sloping bottom 27 and are hooded as indicated at 68 to protect them.

Any moist and tacky bulk material in the hopper or in the conveyor will strike the hot liner and sizzle and bake to produce independent granules that react to the feeding vibratory action of the liner and ease the bulk material to flow without attempting to dry the whole mass. The baked granules thus individually receive the vibratory feeding action and move with the feeding action thus carrying the rest of the bulk material which is damp and tacky and is not otherwise reactive.

As shown in Fig. 7 the trough heater 1 is provided with the top and bottom plates 9 and 3 which are preferably made of aluminum and short bolts 23 through a few holes 21 mount the heater 1 on the trough bottom 30. There are no holes 21 in the wearing plate 2 above the short bolts 23 but the long bolts 23 secure the heavy wearing plate 2 and the heater to the bottom 30 of the feeder trough. The thin light-weight aluminum on both the top 9 and bottom 3 of the heater 1 readily transfers the heat to the heavy wearing plate 2 and the trough bottom 30. The wearing plate 2 may be five-eighths inch or more thick and made of suitable material that will withstand very heavy loads having chunks of a yard square or more. This heavy wearing plate not only saves wear and tear on the trough but also protects the aluminum heater.

I claim:

1. The method of making a heated liner for conveying by feeding vibration which comprises the steps of shaping a metal plate to fit over the conveying surface, drilling a series of prepositioned holes in the plate for mounting bolts, facing one side of the plate with a layer of mica, covering the surface of the mica with a layer of asbestos, laying a pattern of sinuated wire on the asbestos to provide an electrical heating circuit that passes the holes in spaced relation, cement tacking the sinuated wire in place covering the sinuated wire with a second layer of asbestos, covering the second layer of asbestos with a second layer of mica to form a heater, bolting the heater to a second metal plate having aligned holes therein to provide an assembly, applying current to the sinuated wire to heat the assembly and drive the moisture therefrom, sealing the edges of the assembly with a silicon rubber paste to prevent the entry of moisture.

2. The method of claim 1 which also requires the step of welding the heads of the bolts to the face plate to seal the same.

3. The method of claim 1 characterized in that the second plate is a portion of the conveying member.

4. The method of claim 1 characterized in that the first plate is the face and waving plate and the second plate is a shielding plate.

5. A heated liner for sheet members to be vibrated such as conveyor troughs comprising a face wearing sheet, insulation means comprising two outer layers of mica sheets and two inner layers of asbestos sheets, a heating element means in the form of a flat sinuous wire mounted between the asbestos sheets and passing back and forth across the same, mounting means including members distributed in spaced relation over said sheets and securing said sheets and the heating element in clamped relation to the member to be vibrated, parallel bus members, and terminals exterior of said liner connected to said bus members, said heating element means also including sinuous wire being connected in parallel paths across said buses.

6. The heated liner of claim 5 characterized in that said mounting means members are bolts passing through said sheets and between selected runs of said sinuous wire and nuts on said bolts to clamp the parallel paths independently.

7. A heated liner for sheet members to be vibrated such as conveyor troughs comprising a face wearing sheet, insulation means comprising two outer layers of mica sheets and two inner layers of asbestos sheets, a heating element means in the form of a flat sinuous wire mounted between the asbestos sheets and passing back and forth across the same, mounting means including members distributed in spaced relation over said sheets and securing said sheets and the heating element in clamped relation to the member to be vibrated, and a silicon rubber paste sealing the perimetral edges of said sheets.

8. A heated liner for sheet members to be vibrated such as conveyor troughs comprising a face wearing sheet, insulation means comprising two outer layers of mica sheets and two inner layers of asbestos sheets, a heating element means in the form of a flat sinuous wire mounted between the asbestos sheets and passing back and forth across the same, mounting means including members distributed in spaced relation over said sheets and securing said sheets and the heating element in clamped relation to the member to be vibrated, said mounting means members are flat headed bolts with nuts, and said bolt heads are welded flush with said face wearing sheet to seal the same.

9. A heated liner for a trough conveyor comprising superimposed metal sheets, insulation means comprising two outer layers of mica sheets and two inner layers of asbestos sheets between said metal sheets, heat element means in the form of flat sinuous wire mounted in transverse paths between said asbestos sheets and having bus members extending along the opposite sides connecting the ends of the flat sinuous wire and extending to the exterior for connection, sealing means closing the perimetral edges between said sheets, a metal trough having a bottom and side walls, flat headed bolt means distributed in spaced relation between the transverse paths of said sinuous wire to clamp the top and the intermediate sheets to the bottom of said metal trough, a face wearing plate on top of said clamped metal heaters and additional flat headed bolts clamping said wearing sheet and said heater to the bottom of said metal trough said additional bolts also being distributed in spaced relation between said transverse paths of said sinuous wire, the heads of said last mentioned flat headed bolt means being welded to said wearing plate.

10. The structure of claim 9 which also includes means for sealing said wearing plate to the side walls and bottom of said trough.

11. The structure of claim 9 which also includes a back in said trough and a shield welded to said back and covering said wearing plate over terminals extending from said buses.

References Cited in the file of this patent

UNITED STATES PATENTS

| | | |
|---|---|---|
| 1,968,015 | Cooke et al. | July 31, 1934 |
| 2,084,468 | Wach | June 22, 1937 |
| 2,179,819 | Hoving | Nov. 14, 1939 |
| 2,490,111 | Whitehead | Dec. 6, 1949 |
| 2,540,295 | Schreiber | Feb. 6, 1951 |
| 2,574,094 | Fener et al. | Nov. 6, 1951 |
| 2,608,634 | Abbott | Aug. 26, 1952 |
| 2,613,306 | Waltersdorf et al. | Oct. 7, 1952 |
| 2,675,907 | Becker | Apr. 20, 1954 |
| 2,713,415 | Wurzbach | July 19, 1955 |
| 2,766,705 | Flowers | Oct. 16, 1956 |
| 2,782,289 | Nathanson | Feb. 19, 1957 |
| 2,819,788 | Howard | Jan. 14, 1958 |